US 6,526,920 B1

United States Patent
Griffin

(10) Patent No.: US 6,526,920 B1
(45) Date of Patent: Mar. 4, 2003

(54) DOG BOOT FOR HUNTING AND OTHER OUTDOOR ACTIVITIES

(76) Inventor: Robert Griffin, P.O. Box 11548, Denver, CO (US) 80211

(*) Notice: Subject to any disclaimer, the term of this patent is extended or adjusted under 35 U.S.C. 154(b) by 0 days.

(21) Appl. No.: 10/173,363

(22) Filed: Jun. 17, 2002

(51) Int. Cl.[7] .............................. A01K 13/00; B68C 5/00
(52) U.S. Cl. .............................. 119/850; 54/82
(58) Field of Search .................. 119/850, 174; 54/82, 1; 30/144, 146; 36/1.5, 83, 88, 89, 109, 111, 122, 136, 58.5, 59 R, 140

(56) References Cited

U.S. PATENT DOCUMENTS

| | | | |
|---|---|---|---|
| D108,491 S | * 2/1938 | Ford et al. ............... D30/146 |
| D118,006 S | * 12/1939 | Henderson |
| 4,638,579 A | * 1/1987 | Gamm ..................... 2/247 |
| 4,693,018 A | * 9/1987 | Maleyko et al. .......... 36/1.5 |
| 5,090,138 A | * 2/1992 | Borden .................... 36/102 |
| 5,109,613 A | * 5/1992 | Van Dyke ................ 36/114 |
| 5,109,614 A | * 5/1992 | Curry ...................... 36/100 |
| 5,148,657 A | * 9/1992 | Stafford et al. ........... 168/1 |
| 5,408,812 A | * 4/1995 | Stark ....................... 119/850 |
| 5,865,778 A | * 2/1999 | Johnson ................... 36/88 |
| 5,871,458 A | * 2/1999 | Detty ....................... 54/82 |

* cited by examiner

*Primary Examiner*—Thomas Price
(74) *Attorney, Agent, or Firm*—Edwin H. Crabtree; Ramos L. Pizarro; Donald W. Margolis

(57) ABSTRACT

An improved dog boot that covers a dog paw and lower leg and is designed to prevent the boot from twisting and sliding off the dog paw during hunting and other outdoor activities. The dog boot includes a boot top portion attached to a side wall. The side wall is attached to a non-slide sole made of rubberized material and the like. A lower portion of a leg cover is integrally attached to a rear of the boot top portion. A zipper is installed in sides of an opening in the top of the boot top portion and in sides of a front opening along a length of the leg cover. A boot stabilizer is releasably attached to a front of the leg cover for covering a portion of the zipper. The boot stabilizer is used to prevent the boot from twisting on the dog lower leg. The stabilizer includes a pair of straps with hook and loop fasteners for securing and tightening the boot stabilizer around the leg cover, securing the paw and lower leg inside the boot and leg cover and preventing the boot from slipping of the dog paw.

16 Claims, 1 Drawing Sheet

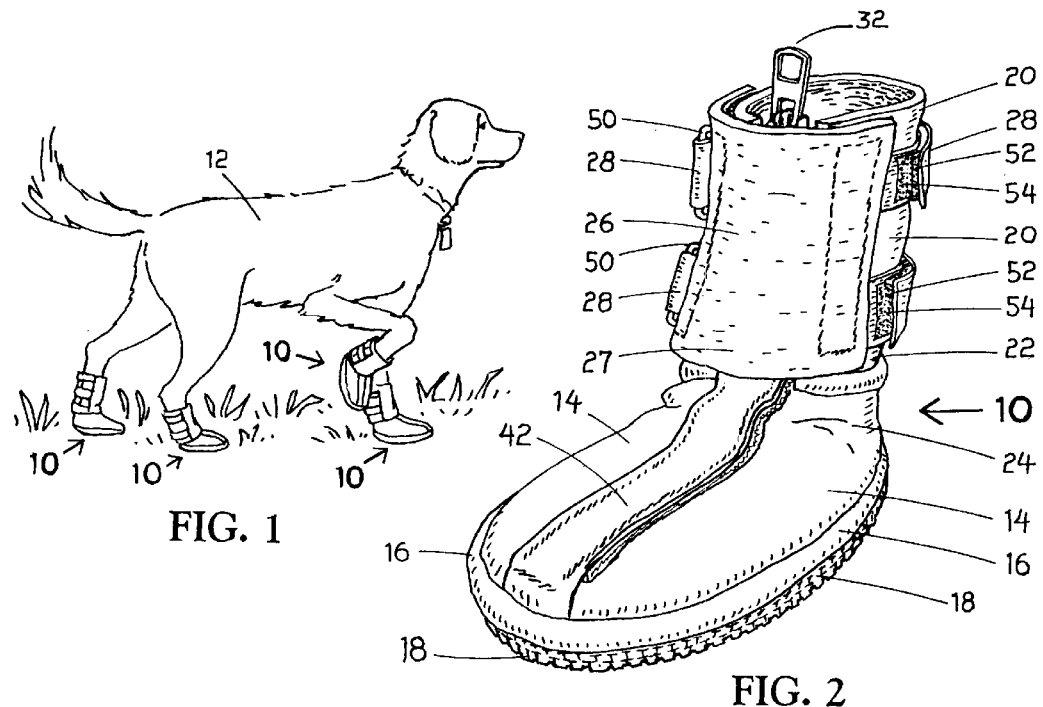
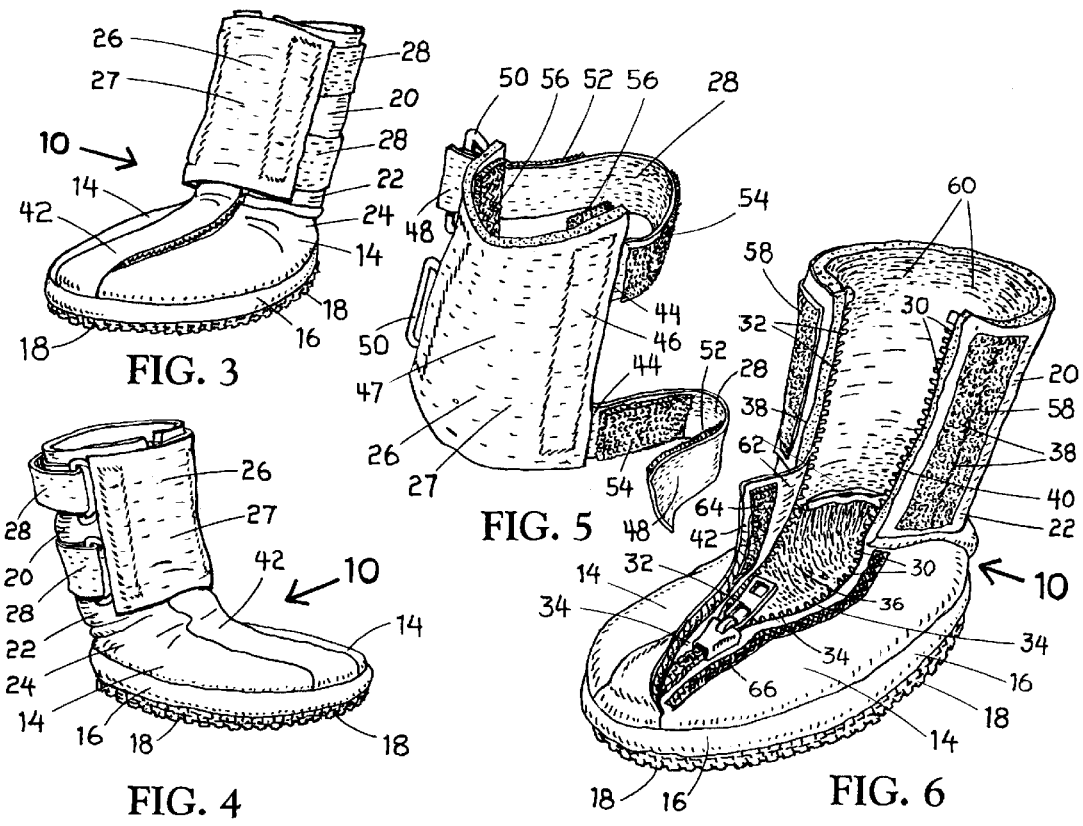

DOG BOOT FOR HUNTING AND OTHER OUTDOOR ACTIVITIES

BACKGROUND OF THE INVENTION (a) Field of the Invention

This invention relates to an improved dog boot for hunting and more particularly, but not by way of limitation, to a dog boot that covers a dog paw and lower leg and is designed to prevent the boot from twisting and sliding off the dog paw during hunting and other outdoor activities.

(b) Discussion of Prior Art

Heretofore, there have been a variety of different types, designs and styles of dog and animal boots. U.S. Patent Des. No. 382,378 to Stark and U.S. Patent Des. No. 417,530 to Darek illustrate two different "sock-like" dog boot designs having lower leg straps with hook and loop fasteners used for tightening the boot on the lower leg of the dog. U.S. Pat. No. 5,495,828 to Solomon et al. discloses a "mitt-like" animal boot with an adjustable fastening strap. The boot is designed to be stitchless and seamless and conforms to the animal paw and lower leg. U.S. Pat. No. 5,408,812 to Stark discloses a hunting dog boot having a lower paw-receiving portion of flexible, moisture-resistance material and a tubular elongated legging portion. The legging portion includes a vertical slit for inserting the paw into the boot and hook and loop fasteners with tightening straps for securing the boot to the dog's lower leg. U.S. Pat. No. 5,148,657 to Stafford et al. describes a dog boot with foot, ankle and calf portions. The boot calf includes a vertical opening for receiving the dog paw inside the boot. U.S. Pat. No. 4,967,542 to MacDonald illustrates a dog boot for the rear leg of a dog. The boot includes a sole extending from the foot to the tarsus joint. An upper heel section has an opening for permitting the foot to enter and be removed from the boot.

None of the above mentioned prior art patents specifically disclose the unique combination of features, structure and function of the subject hunting dog boot as described herein.

SUMMARY OF THE INVENTION

In view of the foregoing, it is a primary objective of the subject invention to provide a dog boot that does not twist or slide off a dog paw when hunting and during other outdoor activities. The dog boot provides protection from burrs, harsh terrain, snow, mud and moisture and can be used for protecting an injured paw and enhanced healing.

Another object of the invention is the use of a zipper in a boot top portion and along a length in the front of a leg cover attached to a rear of the boot top portion. The zipper provides for ease in inserting the dog paw into the boot and removing the paw from the boot.

Still another object of the new dog boot is to provide a boot that is comfortable, durable, flexible, easy to put "on" and "off" the dog paw, water-proof and has a non-slide sole for better traction. Also, the boot comes in various sizes for different size dog paws. Further, the boot is designed for both a dog's front paw and lower leg and a rear paw and lower leg.

The subject improved dog boot includes a boot top portion attached to a side wall. The side wall is attached to a non-slide sole. A leg cover is integrally attached to a rear of the boot top portion. A zipper is installed in the sides of a front opening in the boot top portion and sides of a front opening along the length of the leg cover. A boot stabilizer is attached to a front of the leg cover for covering a portion of the zipper and prevent the boot from twisting on the dog's lower leg. The stabilizer includes a pair of straps with hook and loop fasteners for securing and tightening the stabilizer around the leg cover, securing the paw and lower leg inside the boot and preventing the boot from sliding off the dog's paw.

These and other objects of the present invention will become apparent to those familiar with various types dog boots when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 is a perspective view of the subject improved dog boot mounted on the front and rear dog paws and lower legs of a hunting dog.

FIG. 2 is an enlarged front perspective view of the dog boot with a zipper in a closed position. A boot stabilizer is shown attached around a leg cover. The leg cover is integrally attached to a rear of a boot top portion.

FIG. 3 is a smaller front perspective view of the dog boot shown in FIG. 2.

FIG. 4 is another smaller front perspective view of the dog boot.

FIG. 5 is a perspective view of the boot stabilizer removed from the dog boot. The stabilizer includes straps with hook and loop fasteners used for tightening the stabilizer around the leg cover.

FIG. 6 is a perspective view of the dog boot with the zipper in an open position with the stabilizer removed from the front of the leg cover.

DETAILED DESCRIPTION OF THE PREFERRED EMBODIMENTS

In FIG. 1, a perspective view of the subject improved dog boot is illustrated and having general reference numeral 10. In this drawing, the dog boot 10 is shown mounted on the front and rear dog paws and lower legs of a hunting dog 12. By the nature of the anatomy of dog paws and dog lower legs, the front dog boots 10 are made slightly larger than the rear dog boots 10. As mentioned above, the dog boot 10 is made in different sizes for different size dogs.

In FIG. 2, an enlarged front perspective view of the dog boot 10 is shown. Broadly, the dog boot 10 includes a boot top portion 14, a side wall 16 attached to the sides of the top portion 14, a non-slide sole 18 attached to the side wall 16, a leg cover 20 having a lower portion 22 integrally attached to a rear 24 of the boot top portion 14 and a boot stabilizer 26 having a stabilizer cover 27. The boot stabilizer acts to prevent the boot 10 from twisting on the dog's lower leg. The stabilizer cover 27 includes a pair of straps 28 for tightening the boot stabilizer 26 around the leg cover 20 and preventing the boot from slipping off the dog's paw.

The non-slide sole 18, shown in the drawings, can be made of various types of rubberized products, such as neoprene and the like, for durability, wear resistance and increased traction on various types of terrain and wear during various types of weather conditions. Also, the top portion 14 and the side wall 16 of the boot 10 is made of a heavy nylon type material or the like, which is flexible, wear resistant and waterproof.

A zipper 30 with zipper handle 32 is installed in sides 34 of a front opening 36 in the boot top portion 14 and in sides 38 of a front opening 40 along a length of the leg cover 20. These structural features can be seen in FIG. 6. In FIG. 2, the zipper 30 is shown covered by a zipper cover 42 formed in the boot top portion 14 and covered by the boot stabilizer 26. The zipper handle 32 is shown in this drawing.

In FIG. 3, a smaller front perspective view of the dog boot 10 is shown. In this drawing, the zipper 30 is hidden behind the zipper cover 42 and stabilizer cover 27. Also, the zipper handle 32 is shown folded behind the stabilizer.

In FIG. 4, another smaller front perspective view of the dog boot 10 is shown. In this drawing, the straps 28 of the stabilizer 26 are shown received around the rear of the leg cover 20 to prevent the leg cover from twisting on the lower leg of the dog and slipping off the dog paw.

In FIG. 5, a perspective view of the boot stabilizer 26 is shown and removed from sides 38 of the leg cover 20. In this drawing, the straps 28, used to tighten the boot stabilizer 26 around the leg cover 20, are shown having a first end 44 attached to one side 46 of the stabilizer cover 27. A second end 48 of one of the straps 28 is shown received through one of a pair of loops 50 attached to an opposite side 47 of the stabilizer cover 27. The second end 48 of the straps 28 include hook fasteners 52, which are releasably attached to loop fasteners 54 mounted on the first end 44 of the straps as shown in FIG. 2.

The boot stabilizer 26 also includes a pair of strips of hook fasteners 56 mounted on the inside of the sides 46 and 47 of the stabilizer cover 27. The hook fasteners 56 are used for releasably engaging loop fasteners 58 mounted on the sides 38 of the leg cover 20. The loop fasteners 58 are shown in FIG. 6. In this manner, the boot stabilizer 26 is releasably attached to.the leg cover 20 with the straps 28 used to further tighten the stabilizer around the boot cover. Also and as an option, it should be mentioned that the stabilizer cover 27 can be permanently stitched to one side 38 of the leg cover 20, should it be desired not to make the stabilizer 26 removable from the leg cover 20.

In FIG. 6, a perspective view of the dog boot 10 is shown with the zipper 30 in an open position with the boot stabilizer 26 removed from the front of the leg cover 20. With the stabilizer 26 removed or folded back if attached on one side of the leg cover 20 and the zipper 30 opened, it can be seen that the dog paw can be easily inserted inside the dog boot 10 and later easily removed.

An inside 60 of the leg cover 20 and an inside 62 of the stabilizer cover 27 is made of a soft, flexible rubber material. This feature provides comfort around the dog's lower leg and helps provide for an added gripping surface when the boot stabilizer 26 is tightened around the leg cover 20. Also, an inside 62 of the zipper cover 42 includes a strip of hook fasteners 64 along it's length. The hook fasteners 64 are used to releasably engage a strip of loop fasteners 66 along one of the sides 34 next to the zipper 30 in the boot top portion 14. Obviously, the hook and loop fasteners 64 and 66 are used to hold the zipper cover 42 over the top of the zipper 30 when the zipper is in a closed position as shown in FIGS. 2–4.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A dog boot for receipt on a front or a rear dog paw and lower leg of a dog having different size paws, the dog boot designed not to twist and slide off the lower leg and dog paw, the dog boot comprising:

a non-slide sole made of rubberized material;

a side wall attached to a top of said non-slide sole;

a boot top portion made of soft flexible material, said boot top portion attached to said side wall, said boot top portion having an opening along a length thereof;

a leg cover made of soft flexible material, a bottom portion of said leg cover integrally attached to a rear of said boot top portion, the soft flexible material of said leg cover adapted for conforming around a portion of the dog lower leg for preventing the dog boot from twisting thereon, said leg cover having an opening in the front thereof;

a zipper, said zipper mounted on opposite sides of said opening in said boot top portion and on opposite sides of said opening in the front of said leg cover; and a boot stabilizer with stabilizer cover made of soft flexible material, said stabilizer cover releasably attached to a front of said leg cover and received therearound, the soft flexible material of said boot stabilizer for conforming and tightening around a portion of said leg cover for preventing the twisting of said leg cover on the dog lower leg.

2. The dog boot as described in claim 1 wherein said stabilizer cover includes a pair of straps, a first end of said straps attached to one side of said stabilizer cover, said stabilizer cover received on the front of said leg cover, said straps received around a rear of said leg cover and tightened thereon.

3. The dog boot as described in claim 1 wherein said stabilizer cover includes a pair of strap loops are attached to an opposite side of said stabilizer cover, a portion of said straps received through said strap loops when said straps are tightened on said leg cover.

4. The dog boot as described in claim 3 wherein the first end of said straps includes loop fasteners mounted thereon for releaseably engaging hook fasteners mounted on a second end of said straps.

5. The dog boot as described in claim 1 wherein an inside of said stabilizer cover includes hook fasteners thereon for releasably engaging loop fasteners mounted on opposite sides of the opening in the front of said leg cover.

6. The dog boot as described in claim 1 wherein said boot top portion includes a zipper cover mounted thereon for covering said zipper when said zipper is in a closed position.

7. The dog boot as described in claim 6 wherein an inside of said zipper cover includes a hook fastener for releaseably engaging a loop fastener on one side of the opening in the top of said boot top portion and next to said zipper.

8. A dog boot for receipt on a front or a rear dog paw and lower leg of a dog having different size paws, the dog boot designed not to twist and slide off the lower leg and dog paw, the dog boot comprising:

a non-slide sole made of rubberized material;

a side wall attached to a top of said non-slide sole;

a boot top portion made of soft flexible material, said boot top portion attached to said side wall, said boot top portion having an opening along a length thereof; said sole, said side wall and said boot top portion dimensioned and adapted for receipt on, around and on top of the dog paw for a comfortable fit;

a leg cover made of soft flexible material, a bottom portion of said leg cover integrally attached to a rear of said boot top portion, the soft flexible material of said leg cover adapted for conforming around a portion of the dog lower leg for preventing the dog boot from twisting thereon, said leg cover having an opening in the front thereof;

a zipper with zipper handle, said zipper mounted on opposite sides of said opening in said boot top portion and on opposite sides of said opening in the front of said leg cover; and a boot stabilizer with stabilizer cover made of soft flexible material, said stabilizer cover releasably attached to a front of said leg cover and received therearound, the soft flexible material of said boot stabilizer for conforming and tightening around a portion of said leg cover for preventing the twisting of said leg cover on the dog lower leg, said boot stabilizer including a pair of straps, a first end of said straps attached to one side of said stabilizer cover and a pair of strap loops are attached to an opposite side of said stabilizer cover, a portion of said straps received through said strap loops when said straps are tightened on said leg cover.

9. The dog boot as described in claim 8 wherein the first end of said straps include loop fasteners mounted thereon for releaseably engaging hook fasteners mounted on a second end of said straps.

10. The dog boot as described in claim 8 wherein said boot top portion includes a zipper cover mounted thereon for covering said zipper when said zipper is in a closed position.

11. The dog boot as described in claim 10 wherein an inside of said zipper cover includes a hook fastener for releaseably engaging a loop fastener on one side of the opening in the top of said boot top portion and next to said zipper.

12. A dog boot for receipt on a front or a rear dog paw and lower leg of a dog having different size paws, the dog boot designed not to twist and slide off the lower leg and dog paw, the dog boot comprising:

a non-slide sole made of rubberized material;

a side wall attached to a top of said non-slide sole;

a boot top portion made of soft flexible material, said boot top portion attached to said side wall, said boot top portion having an opening along a length thereof;

a leg cover made of soft flexible material, a bottom portion of said leg cover integrally attached to a rear of said boot top portion, the soft flexible material of said leg cover adapted for conforming around a portion of the dog lower leg for preventing the dog boot from twisting thereon, said leg cover having an opening in the front thereof;

a zipper, said zipper mounted on opposite sides of said opening in said boot top portion and on opposite sides of said opening in the front of said leg cover;

a zipper cover mounted on one side of said opening in said boot top portion for covering said zipper when said zipper is in a closed position; and a boot stabilizer with stabilizer cover made of soft flexible material, said stabilizer cover releasably attached to a front of said leg cover and received therearound, the soft flexible material of said boot stabilizer for conforming and tightening around a portion of said leg cover for preventing the twisting of said leg cover on the dog lower leg.

13. The dog boot as described in claim 12 wherein said stabilizer cover includes a pair of straps, a first end of said straps attached to one side of said stabilizer cover, said stabilizer cover received on the front of said leg cover, said straps received around a rear of said leg cover and tightened thereon.

14. The dog boot as described in claim 13 wherein said stabilizer cover includes a pair of strap loops are attached to an opposite side of said stabilizer cover, a portion of said straps received through said strap loops when said straps are tightened on said leg cover.

15. The dog boot as described in claim 14 wherein the first end of said straps include loop fasteners mounted thereon for releaseably engaging hook fasteners mounted on a second end of said straps.

16. The dog boot as described in claim 12 wherein an inside of said stabilizer cover includes hook fasteners thereon for releaseably engaging loop fasteners mounted on opposite sides of the opening in the front of said leg cover.

* * * * *